Patented Sept. 28, 1937

2,094,097

UNITED STATES PATENT OFFICE 2,094,097

LUBRICANTS

Frederick Baxter Downing, Carneys Point, and Anthony Francis Benning, Penns Grove, N. J., assignors to E. I. du Pont de Nemours & Company, Wilmington, Del., a corporation of Delaware No Drawing. Application April 24, 1934, Serial No. 722,146

20 Claims. (Cl. 87—9)

This invention relates to lubrication and particularly to the improvement of extreme pressure lubricating characteristics of lubricants by the addition of assisting agents.

The advantages of a high pressure lubricant become apparent when the present trend in design of automotive and other machine parts, and the increased strength of metal parts, due to the use of alloy steels, is considered. The pressures ordinarily found in well lubricated journal bearings do not exceed 2,000 lbs./sq. in. and, for conditions such as this, a film of heavy oil can be expected to remain between the rubbing surfaces. When gears are considered, where the contact between surfaces is of very small width, the bearing pressures often reach values as high as 25,000 lbs./sq. in. Under such extreme pressure, it is unlikely that any oil or grease can be obtained which will be viscous enough to prevent metallic contact. The result of the lack of a lubricating film between the rubbing surfaces results in scoring and scuffing of the gears.

Failure to maintain lubricant films on idle bearing surfaces is now well recognized as the cause of 70 to 80% of the wear occurring on cylinder walls of automotive and other internal combustion engines. When an engine is stopped, the oil film on the vertical surfaces soon drains off and, when the machine is again started up, an appreciable time elapses before the circulation provides oil for the formation of new lubricant films. An assistant which, when added to the motor oil, will prevent the separation of the oil film from the metal should prevent a large part of the wear now occurring.

Prior to this invention various assistants have been added to oils to improve their lubricating properties. Among such assisting materials which have been used are sulfur, sulfur chloride, sulfurized oil or oil containing naturally occurring sulfur, various heavy metal soaps and aluminum soaps, castor oil and, recently, aliphatic and aromatic halides. While some of these assistants, such as the sulfur and the organic halides improve the lubricating properties of the oil to a great extent, they have not proved to be satisfactory for use for the reason that those heretofore employed are corrosive or give rise to corrosive agents by hydrolysis or oxidation. Also, this corrosive action is greatly intensified by the presence of small amounts of water. Some of the alkyl halides are volatile and, hence, are soon lost. Other assistants such as the alkali and heavy metal soaps have proved to be of little value in improving the lubricating properties of the oils.

An object of this invention is to provide materials which, when brought into contact with metal bearing surfaces will form a lubricating film between such bearing surfaces, which lubricating film will adhere to the metal surfaces and resist high pressures. A further object of this invention is to provide materials which, when added to lubricating media, improve their properties, particularly their adhesiveness and resistance to high pressure. A further object is to provide a method for retarding wearing and seizing of bearing surfaces. Other objects are to provide new compositions of matter and to advance the art. Still other objects will appear hereinafter.

These objects may be accomplished in accordance with our invention which comprises contacting metallic bearing surfaces with the combination of oxidizing nitro-bodies and a sulfur containing material capable of being oxidized. This combination may exist in one molecule as in nitro aryl thiocyanates, nitro aryl sulfides and nitro aryl mercaptans or in separate molecules as in combinations of nitro aryl compounds with organic mercaptans, nitro aryl compounds with organic sulfides and nitro aryl compounds with organic thiocyanates. When such combinations are brought into contact with metallic bearing surfaces they adhere to such surfaces forming noncorrosive lubricating films which will have a low coefficient of friction, will retard the wear of the bearing surface, will withstand high bearing pressures and will prevent metallic contact of the bearing surfaces even under high bearing pressures. The films will have exceptional lubricating properties at all pressures and rubbing speeds but are particularly valuable at high bearing pressures. Such films will not be washed from the bearing surfaces by water, oil or ordinary organic solvents such as gasoline, naphtha and the like.

It will generally be found to be desirable to employ the combinations in a liquid carrying medium or a grease. The liquid carrying medium may be any liquid in which the ingredients of the combinations may be dissolved, dispersed or emulsified. The combinations of compounds of our invention are much more effective in lubricating oils and greases than in other carrying media and hence it will generally be preferable to employ lubricating oils and greases as the carrying media.

Among the compounds and combinations of compounds which we have found to be particularly effective for our purpose are di-nitro phenyl thiocyanate, o-dinitro diphenyl disulfide, tetra nitro diphenyl sulfide, dinitro phenol plus lorol thiocyanate, alpha-nitro naphthalene plus a mixture of amyl mercaptans, alpha-nitro naphthalene plus dilauryl disulfide.

The term "lorol" as employed throughout the specification and in the claims will be understood to mean and indicate derivatives of lorol alcohol which comprises a mixture of primary aliphatic alcohols containing 8 and 10 carbon atoms which mixture is obtained by the fractionation of the alcohols resulting from the reduction of cocoanut or palm kernel oils. This mixture of alcohols has a boiling range of 140° to 195° C. at 50 mm.

The combinations of our invention will be effective when employed in an oil or other carrying medium in extremely small amounts. However, in practice, it will generally be found desirable to employ at least 0.1% based on the oil. Further, the amount added to the oil or other carrying medium will be largely dependent upon the machinery in which it is applied and the area of the metal surfaces with which it will be brought into contact. When the combination comprises two distinct compounds one containing the nitro group and the other the sulfur, the relative proportions of the two compounds may vary within wide limits. However, the best results will generally be obtained when the combination comprises from about 1 to about 2 parts of the nitro compound to about 1 to about 2 parts of the sulfur compound.

The method of testing our compounds was that devised by J. O. Almen (Oil and Gas Journal, 30, 109, 1931). This method consists of running a ¼" diameter drill rod between two halves of a split bushing which is maintained stationary. The load on the bushing is controllable and provision is made for measuring the torque developed by the friction of the lubricant film. A hydraulic system for increasing the loading on the bushing until the oil film breaks and the metal seizes is provided. The rubbing speed is about 50 feet per minute and the method of loading is gradual, one weight being added to the loading lever each ten seconds. Each weight added to the loading lever increases the pressure on the bushing by about 125 lbs. The machine provides for beam loadings up to 20 weights which corresponds to a pressure of 20,000 lbs./sq. in. on the full projected area of the drill rod. The bearing surface of the bushing is cut to a diameter 0.007 inch larger than the drill rod so that, before any wear occurs, the actual bearing surface is a line. As wear occurs, the bearing surface widens but seldom covers the bushing. After a test, the width of the bearing scar can be measured and an approximate value for the actual bearing pressure obtained. The values given in the following examples represent the calculated actual bearing pressures which were reached in the tests without failure of the film. These values represent film strength or film resistance.

When subjected to the above tests, a good grade of paraffin oil will withstand a pressure of only 3 to 5,000 lbs./sq. in. When an oil containing sulfur is tested by the same method, such oil will show a film strength of about 20,000 lbs./sq. in. and will give a torque reading of about 4.7 lb. ft. at this load.

In order to more clearly illustrate our invention and the advantageous results to be obtained thereby the following examples are given:

Example 1

One part of 2:4-dinitrophenyl thiocyanate, $(NO_2)_2C_6H_3CNS$, was dissolved in 200 parts of a medium viscosity motor oil. This compounded lubricant withstood a test pressure of 30,000 lb. per sq. in. The friction torque was 3.1 lb. ft. For comparison, the untreated motor oil itself only withstood 5,000 lb. per sq. in.

Example 2

One part of di-o-nitrophenyl disulfide, $(NO_2C_6H_4)_2S_2$, was dissolved in 100 parts of lubricating oil. On test, this mixture withstood a pressure of about 30,000 lb. per sq. in. and gave a friction torque of 3.3 lb. ft.

Example 3

One part of di-2:4-dinitrophenyl sulfide was dissolved in 100 parts of lubricating oil. The test load carried was about 30,000 lbs. per sq. in. with a friction torque of 3.0 lb. ft.

Example 4

Two parts of 2:4-dinitro phenol, one part of lorol thiocyanate and 200 parts of lubricating oil were mixed. The compounded oil withstood bearing pressures up to about 14,000 lb. per sq. in. and gave a friction torque of 1.8 lb. ft. at this load.

Lorol thiocyanate is the thiocyanate derived from lorol alcohol. Lorol alcohol is a mixture of primary aliphatic alcohols of 8 and 10 carbon atoms obtained by reduction of cocoanut and palm kernel oils.

Example 5

Two parts of mixed amyl mercaptans and about two parts a-nitronaphthalene were mixed with about 100 parts of lubricating oil. The test load carried was about 20,000 lb. per sq. in. The friction torque was 2.8 lb. ft.

Example 6

One part of dilauryl disulfide, ⅔ part of a-nitro naphthalene and about 80 parts of a medium viscosity oil were mixed and tested. The maximum test loading which the oil stood was about 10,000 lb. per sq. in. The friction torque was 1.4 lb. ft.

Example 7

One part of 2:4-dinitrophenyl thiocyanate was dissolved in 99 parts of lorol alcohol ($C_8$ to $C_{12}$ straight chain saturated primary alcohols). It withstood an Almen test load of over 20,000 lb. per sq. in.

Example 8

One part of 2:4-dinitrophenyl thiocyanate was dissolved in 99 parts of benzene. On test, this mixture withstood over 20,000 lb. per sq. in. The developed torque was 2.2 lb. per ft.

The above examples are merely illustrative of our invention. As a general rule, any nitro aromatic compound may be employed with any compound containing an oxidizable sulfur containing group. However, it will usually be undesirable to employ compounds containing more than two nitro groups in a single nucleus, because of the explosive properties of such compounds. Also, the nitro aromatic compounds in which the aryl nucleus belongs to the benzene, biphenyl and naphthalene series will generally be preferred because of their lower melting points, greater solubility and reactivity.

Other nitro aromatic compounds and types of compounds which may be mentioned are nitro benzene; the dinitro benzenes as o-dinitro benzene; the alkyl substituted nitro benzene compounds such as the mono- and di-nitro toluenes, the nitro xylenes, etc. the mono- and di-nitro phenols; b-nitro naphthalene; the dinitro naphthalenes; the nitro naphthalenes containing other substitutents such as the alkyl, hydroxy, halogen and like radicals; the nitro biphenyls such as p-nitro biphenyl, o-dinitro biphenyls, p-p' dinitro biphenyl, and nitro phenyl-phenols. The isomers, homologues and analogs of the above compounds as well as those of the examples will also be effective.

Other sulfur containing compounds which may be mentioned are the aryl mercaptans represented by thio-phenol, thio-cresols, thio-pyrocatechol, thio-napthol, the thio phenyl-phenols, etc.; the aryl thiocyanates such as phenyl thiocyanate, tolyl thiocyanate, naphthyl thiocyanates, biphenyl thiocyanates, etc.; the aryl sulfides such as diphenyl sulfide, thio-aniline, thio-toluidines, thio-diphenylamine, dinaphthyl sulfide, di-biphenyl sulfides and the corresponding disulfides; the alkyl sulfides, such as dibutyl sulfide, diamyl sulfide and dilauryl sulfide; the alkyl mercaptals and mercaptols; aryl alkyl sulfides such as phenyl methyl sulfide, and phenyl ethyl sulfide; and the liquid sulfur products comprising a complex mixture of saturated and unsaturated alkyl mercaptans and sulfides obtained in the sweetening of sour petroleum oils. The isomers, homologues and analogs of the above compounds may also be employed.

Other compounds containing both nitro aryl groups and oxidizable sulfur containing groups are the nitro aryl mecaptans such as the mono- and di-nitro thio phenols including the thio-cresols, thio naphthols and thio phenyl-phenols, their homologues and analogs.

We believe that, when the nitro aromatic compounds and oxidizable sulfur containing groups are present in separate compounds employed in combination, the compounds react with each other in the oil or other medium adjacent the bearing surfaces to form complex compounds. We believe that such complex compounds are the active materials in the formation of the films on the metallic bearing surfaces. However, we do not wish to be restricted to any theory as to how our compounds produce their effect. Accordingly, the nitro compound may be caused to react with the sulfur compound, under conditions similar to those prevailing at the bearing surfaces, prior to their incorporation into the oil or other medium. Such reaction products will be effective and come within the scope of our invention. Many other compounds containing both a nitro aromatic group and an oxidizable sulfur containing group and combinations of compounds containing nitro aromatic groups and oxidizable sulfur containing groups will readily suggest themselves to those skilled in the art.

The compounds hereinbefore mentioned and described are in general well known and the methods for preparing them are also well known and described in the literature. Accordingly, a detailed description of the methods to be employed for making the compounds is believed to be unnecessary.

From the preceding description it will be apparent that the combination of compounds of our invention are lubricants for metallic surfaces and suitable assistants to be added to lubricating oils, greases and other liquids to form lubricating compositions for metallic surfaces and which will be effective at extreme pressures.

The compounds of our invention, when brought into contact with metal bearing surfaces, apparently form an adherent film thereon which film will withstand high bearing pressures without breaking down and thus will prevent metallic contact of the bearing surfaces. When incorporated in an oil or grease, our compounds cause the oil and grease to adhere more firmly to the bearing surfaces. This is a particularly desirable and advantageous characteristic of our compounds, particularly adapting them for use where the bearing surfaces are vertical and an ordinary oil tends to drain therefrom, as in the cylinders of internal combustion engines. Furthermore, the film, produced by our compounds, remains on the bearing surfaces even after the oil or other carrying media has been drained off and continues to exert its effect until worn off. Such film will not be removed by washing with water, gasoline, solvent naphtha and the like.

Under ordinary conditions of use, our compounds are non-corrosive and do not induce corrosion in the presence of water. Our compounds are effective where the rubbing speeds are high as well as where they are low as in gears.

In our examples, we have disclosed the use of our compounds in lubricating oils. However, they may also be employed in greases, oil emulsions and other liquids such as benzene, gasoline, diphenyl, diphenyl oxide, kerosene, naphtha, vegetable oils, alcohols and the like.

The use of cutting oils in machining operations is well known. The cutting fluid has two functions; the first to provide a lubricant to reduce the friction between the cutting tool and the work, and the second to provide a means for cooling the work.

The general practice is to use either an oil or a dispersion of oil in water. The oils used vary considerably depending on the particular operation and may vary from a light mineral oil to a heavy mixture of mineral and animal oils. The water suspensions are usually made up from oils by the addition of dispersing agents of the Turkey red oil type. Recently the practice of adding sulfur or sulfur compounds has become common.

Die shaping of sheet metals and drawing of sheets and wires and tubes has also recently been improved by the use of a lubricant between the contacting surfaces.

Cutting oils are now generally made up by compounding about 30 parts of lard oil, one to five parts of sulfur, two to ten parts of a petroleum sulfonate or Turkey red oil and about 60 parts of mineral oil. This mixture is then used undiluted or dispersed in water which improves its cooling properties.

The lard oil, of course, breaks down under the high temperature conditions of use resulting in the formation of disagreeably odorous materials. The presence of sulfur, as in motor and gear lubricants, is, in general, a possible source of corrosive material necessitating the careful washing of machined parts before use. These oils have also given considerable trouble from infection of the workmen which is only partially eliminated by the incorporation of a bactericide in the oil.

Wire drawing also requires an extreme pressure lubricant. Several types are in use but essentially they are the same as the ordinary cutting oils.

The pressures between the rubbing surfaces during all machining operations are obviously very high as they result in deformation of the metal. This is, therefore, another problem of extreme pressure lubrication.

Our combinations of compounds may be employed in oil, oil emulsions or other suitable media as cutting oil compositions with the attending elimination of the odors and corrosiveness which are objectionable properties of most prior cutting oils. They will be effective at very low concentrations in oil.

Other improvements similar to those observed on bearing lubrication should also result from such use. Decreased friction, safety from corrosion, and improved quality of the work are important results of their use.

While we have disclosed specific embodiments of our invention, it will be readily apparent to those skilled in the art that many modifications and variations may be made therein without departing from the spirit of our invention. Accordingly, the scope of our invention is to be limited solely by the appended claims construed as broadly as is permissible in view of the prior art.

We claim:

1. The method of retarding wearing and seizing of metallic bearing surfaces which comprises maintaining therebetween a film of a lubricating medium and at the same time chemically acting upon such surfaces by means of a member of the group consisting of a compound containing a nitro aromatic nucleus and an oxidizable sulfur containing group, a nitro aromatic compound in combination with an organic compound containing an oxidizable sulfur containing group and the products obtained by the chemical reaction of a nitro aromatic compound on an organic compound containing an oxidizable sulfur containing group.

2. The method of retarding wearing and seizing of metallic bearing surfaces which comprises maintaining therebetween a film of a lubricating medium and at the same time chemically acting upon such surfaces by means of a member of the group consisting of nitro aromatic thiocyanates, nitro aromatic sulfides, nitro aromatic mercaptans, organic thiocyanates in combination with nitro aromatic compounds, organic sulfides in combination with nitro aromatic compounds, and organic mercaptans in combination with nitro aromatic compounds.

3. The method of retarding wearing and seizing of metallic bearing surfaces which comprises maintaining therebetween a film of a lubricating medium and at the same time chemically acting upon such surfaces by means of a member of the group consisting of nitro aromatic thiocyanates, nitro aromatic sulfides, nitro aromatic mercaptans, aliphatic thiocyanates in combination with nitro aromatic compounds, aliphatic sulfides in combination with nitro aromatic compounds, and aliphatic mercaptans in combination with nitro aromatic compounds.

4. The method of retarding wearing and seizing of metallic bearing surfaces which comprises maintaining therebetween a film of a lubricating medium and at the same time chemically acting upon such surfaces by means of a member of the group consisting of nitro aryl thiocyanates, nitro aryl sulfides, nitro aryl mercaptans, alkyl thiocyanates in combination with nitro aromatic compounds, alkyl sulfides in combination with nitro aromatic compounds, and alkyl mercaptans in combination with nitro aromatic compounds.

5. The method of retarding wearing and seizing of metallic bearing surfaces which comprises maintaining therebetween a film of a lubricating medium and at the same time chemically acting upon such surfaces by means of a member of the group consisting of nitro aryl thiocyanates, nitro aryl sulfides, and nitro aryl mercaptans.

6. Oils and greases having incorporated therein a member of the group consisting of a compound containing a nitro aromatic nucleus and an oxidizable sulfur containing group, a nitro aromatic compound in combination with an organic compound containing an oxidizable sulfur containing group and the products obtainable by the chemical reaction of a nitro aromatic compound on an organic compound containing an oxidizable sulfur containing group.

7. Oils and greases having incorporated therein a member of the group consisting of nitro aromatic thiocyanates, nitro aromatic sulfides, nitro aromatic mercaptans, organic thiocyanates in combination with nitro aromatic compounds, organic sulfides in combination with nitro aromatic compounds, and organic mercaptans in combination with nitro aromatic compounds.

8. Oils and greases having incorporated therein a member of the group consisting of nitro aromatic thiocyanates, nitro aromatic sulfides, nitro aromatic mercaptans, aliphatic thiocyanates in combination with nitro aromatic compounds, aliphatic sulfides in combination with nitro aromatic compounds, and aliphatic mercaptans in combination with nitro aromatic compounds.

9. Oils and greases having incorporated therein a member of the group consisting of nitro aryl thiocyanates, nitro aryl sulfides, nitro aryl mercaptans, alkyl thiocyanates in combination with nitro aromatic compounds, alkyl sulfides in combination with nitro aromatic compounds, and alkyl mercaptans in combination with nitro aromatic compounds.

10. Oils and greases having incorporated therein a member of the group consisting of nitro aryl thiocyanates, nitro aryl sulfides, and nitro aryl mercaptans.

11. The method of retarding wearing and seizing of metallic bearing surfaces which comprises maintaining therebetween a film of a lubricating medium and at the same time chemically acting upon such surfaces by means of a dinitrophenyl thiocyanate.

12. The method of retarding wearing and seizing of metallic bearing surfaces which comprises maintaining therebetween a film of a lubricating medium and at the same time chemically acting upon such surfaces by means of 2:4-dinitrophenyl thiocyanate.

13. The method of retarding wearing and seizing of metallic bearing surfaces which comprises maintaining therebetween a film of a lubricating medium and at the same time chemically acting upon such surfaces by means of a tetranitro diphenyl sulfide.

14. The method of retarding wearing and seizing of metallic bearing surfaces which comprises maintaining therebetween a film of a lubricating medium and at the same time chemically acting upon such surfaces by means of di-2:4-dinitrophenyl sulfide.

15. The method of retarding wearing and seizing of metallic bearing surfaces which comprises maintaining therebetween a film of a lubricating medium and at the same time chemically acting upon such surfaces by means of the combination of lorol-thiocyanate and nitro benzene.

16. Oils and greases having incorporated therein at least 0.1% of a dinitrophenyl thiocyanate.

17. Oils and greases having incorporated therein at least 0.1% of 2:4-dinitrophenyl thiocyanate.

18. Oils and greases having incorporated therein at least 0.1% of a tetranitro diphenyl sulfide.

19. Oils and greases having incorporated therein at least 0.1% of di-2:4-dinitrophenyl sulfide.

20. Oils and greases having incorporated therein at least 0.1% of the combination of nitrobenzene and lorol-thiocyanate, there being about 1 to about 2 parts of nitrobenzene for each 1 to 2 parts of lorol-thiocyanate.

FREDERICK BAXTER DOWNING.
ANTHONY FRANCIS BENNING.